(12) United States Patent
Hoffman et al.

(10) Patent No.: US 7,292,387 B2
(45) Date of Patent: Nov. 6, 2007

(54) METHODS AND SYSTEMS TO ENHANCE MULTIPLE WAVE MIXING PROCESS

(75) Inventors: Hanna J. Hoffman, Palo Alto, CA (US); David S. Spence, Mountain View, CA (US); Alan B. Petersen, Palo Alto, CA (US); James D. Kafka, Palo Alto, CA (US)

(73) Assignee: Spectra-Physics, Inc., Mountain View, CA (US)

( * ) Notice: Subject to any disclaimer, the term of this patent is extended or adjusted under 35 U.S.C. 154(b) by 0 days.

(21) Appl. No.: 11/332,555

(22) Filed: Jan. 12, 2006

(65) Prior Publication Data

US 2006/0250677 A1    Nov. 9, 2006

Related U.S. Application Data

(60) Provisional application No. 60/643,709, filed on Jan. 12, 2005.

(51) Int. Cl.
*G02F 1/35* (2006.01)
*G02F 2/02* (2006.01)

(52) U.S. Cl. ............... 359/329; 356/326; 356/328
(58) Field of Classification Search ........... 359/326, 359/328, 329
See application file for complete search history.

(56) References Cited

U.S. PATENT DOCUMENTS

| | | | | |
|---|---|---|---|---|
| 5,355,246 | A * | 10/1994 | Tanuma | 359/326 |
| 5,936,761 | A * | 8/1999 | Kubota et al. | 359/328 |
| 6,421,166 | B1 * | 7/2002 | Velsko et al. | 359/330 |
| 6,441,948 | B1 * | 8/2002 | Wu et al. | 359/326 |
| 6,636,343 | B1 * | 10/2003 | Richman | 359/330 |
| 7,113,325 | B1 * | 9/2006 | Moulton et al. | 359/326 |
| 2003/0043452 | A1 * | 3/2003 | Heist | 359/326 |
| 2004/0240491 | A1 * | 12/2004 | Nebel et al. | 372/21 |
| 2006/0250677 | A1 * | 11/2006 | Hoffman et al. | 359/326 |

* cited by examiner

*Primary Examiner*—Michelle Connelly-Cushwa
*Assistant Examiner*—Rhonda S. Peace
(74) *Attorney, Agent, or Firm*—Brian F. Swienton

(57) ABSTRACT

Frequency conversion methods are taught wherein non-collinear phase matching configurations may be implemented in non-linear crystals used in three wave mixing processes such that the frequency conversion efficiency is enhanced through walk-off compensation while also maximizing conversion efficiency. The harmonic conversion techniques are especially applicable to sum frequency process, and in particular to third harmonic generation.

72 Claims, 13 Drawing Sheets

# METHODS AND SYSTEMS TO ENHANCE MULTIPLE WAVE MIXING PROCESS

CROSS- REFERENCE TO RELATED APPLICATIONS

The present application claims priority to U.S. patent application Ser. No. 60/643,709 filed Jan. 12, 2005, the contents of which are hereby incorporated by reference in its entirety.

BACKGROUND

In nonlinear interactions involving harmonic generation, it is desirable to employ non-critical phase matching (NCPM). One challenge associated with harmonic generation processes involves the beam walk-off-effect. The walk-off-effect is known to be detrimental to the nonlinear conversion process because it limits the effective interaction length between the beams generated within the laser cavity during the harmonic generation process and reduces the overall efficiency of conversion.

In the case of second harmonic generation (SHG), the desire to eliminate walk-off between the ordinary and extraordinary rays has increasingly led to the use of the nonlinear crystal lithium triborate (LBO). Conversion efficiencies in excess of 50% have been demonstrated using Type-I phase matching (PM) with this crystal, which can be temperature tuned at around 150° C. to maintain the non-critical phase-matching conditions. In recent years, LBO has largely replaced KTP as the crystal of choice to frequency double radiation from diode pumped Nd-lasers such as Nd:YAG and Nd:YVO4 in configurations both external and internal to the cavity due to its low absorption at both fundamental (1.064 µm for both Nd:YAG and Nd:YVO4) and the second harmonic (SH) at 532 nm. In addition, this material has a high damage threshold and resistance to grey tracking relative to other materials.

There are, however, situations where NCPM LBO cannot be used advantageously. For example, heretofore LBO was not used as a NCPM tripler for third harmonic generation (THG) of 1064 nm beams. Further, alternate materials, including the newly developed GdYCOB fail to meet cost and lifetime requirements essential to practical laser systems. Thus, most existing diode-pumped laser systems designed to produce UV light at high repetition rates utilize tripler crystals such as LBO and BBO in CPM arrangements. While these systems were somewhat successful as third harmonic generators, a number of shortcomings were identified. For example, the walk-off between the ordinary and extraordinary rays in the CPM tripler crystal, the separation between the fundamental and second harmonic beams which progressively increases as the beams propagate through the crystal reduces the THG conversion efficiency.

In response thereto, a number of approaches have been devised to compensate for the walk-off effect in THG processes. For example, Pieterse et al. in U.S. Pat. No. 5,835,513 taught the use of two CPM crystals in a THG process wherein the walk-off generated by a suitably orientated tripler second crystal is offset by the walk-off in the first doubler crystal. Pieterse further taught that an optical element may be positioned intermediate to the two crystals so as to modify the walk-off angle produced by the doubler thereby maximizing the conversion efficiency into the UV. While this approach was somewhat successful in reducing walk-off effects, a number of shortcoming were identified. For example, complete compensation for walk-off effects was often difficult to achieve. Further, the cost and complexity of the laser system was increased.

An alternate approach disclosed in U.S. Pat. No. 5,136, 597, issued to Nightingale proposed to use a non-collinear arrangement for the purpose of compensating for walk-off in a SHG process. Specifically, Nightingale taught that a doubler crystal can be cut at a specific angle to thereby alter the direction of incidence of the fundamental beam from normal to the crystal's face.

While useful in some applications, some shortcomings associated with the method Nightingale disclosed have been identified. More specifically, Nightingale failed to appreciate the complications that may arise when attempting to compensate walk-off angles of two incident extraordinary beams, a situation which is sometimes referred to as Type-III PM.

In light of the foregoing, there is an ongoing need for a method of methods of generating harmonics wherein the walk-off of both the fundamental and harmonic beams can be optimally compensated to thereby improve the harmonic generation efficiency in practical laser systems

SUMMARY

The present application discloses methods and systems for obtaining enhanced frequency conversion efficiencies in non-linear crystals designed for multiple wave mixing interactions. For example, the present application discloses methods and systems which may be used for obtaining enhanced frequency conversion efficiencies in non-linear crystals designed for three wave mixing interactions. However, those skilled in the art will appreciate that any number of wave mixing interactions may be addressed using the methods and systems disclosed herein. Optimization of the conversion efficiency according to the methods disclosed herein may be employed when the angles of incidence of the interacting beam(s) relative to the input crystal face are selected in tandem with orienting the crystal and adjusting the temperature so as to preserve the requisite PM conditions. The geometric PM configuration may be non-collinear but provisions are made to achieve optimal spatial overlap between the waves thereby ensuring long effective interaction lengths. The PM conditions are further selected in full consideration of the interacting beams characteristics, including wavelengths, divergence, spot size and roundness. The methods disclosed herein comprise optimization of the conversion efficiency using an analysis unique to each multiple-wave, (e.g. three-wave) mixing process/nonlinear crystal combination. The analysis permits the parameter space to include non-collinear PM, with due consideration given to practical limitations such as available crystal sizes and ovens, as well as optimal non linear coefficients and requisite beam diameters, output beam quality and crystal lifetime issues. As such, this process optimization procedure results in a set of criteria identifying appropriate crystal cuts and preferred types of PM, crystal temperatures and angles of incidence. Some experimentation may be used as part of the procedure to establish the most optimal, practical and efficient configuration suited to converting the frequency of specific laser systems.

In addition, the present application discloses methods for maximizing the efficiency of multiple wave mixing processes, with particular emphasis on SFM including, but not limited to harmonic generation. For example, the methods disclosed herein may be used in three wave mixing architectures. In the alternative, any number of waves may be mixed using the methods and systems disclosed in the present application.

Further, the present application discloses methods and systems to optimize the efficiency while taking into account crystal lifetime, incident beam profiles, beam quality and alignment sensitivity considerations.

In addition, the present application discloses various methods and systems for compensating for the walk-off in a THG crystal using non-collinear phase matching scheme wherein the walk-off compensation is optimized while maintaining PM between the fundamental, the second harmonic and the third harmonic beams. For example, in one embodiment the methods and systems disclosed herein include multiple 1 micron beams, a crystal cut for NCPM may be utilized as the doubler crystal, allowing compensation of the walk-off in a tripler crystal cut for a CPM configuration to thereby achieve THG conversion efficiencies in excess of 30%.

Furthermore, the methods and systems disclosed herein may be configured to utilize sum frequency mixing configurations wherein the incident beams have an angular separation inside the crystal defined by the efficiency enhancement criteria unique to the specific process. These criteria may include partial or complete walk-off compensation of one or more beams as required to maximize the effective interaction length in the crystal.

In another embodiment, the present application discloses various methods to achieving optimal conversion efficiencies include as a key criterion utilization of a minimal number of additional optical elements.

In still another embodiment, the present application discloses a frequency converted laser system is provided comprising of a laser source producing short pulses such as may be obtained from a Q-switched or a mode locked laser and one or more nonlinear crystals oriented for harmonic conversion of the fundamental output of the laser. Optionally, the lasers may comprise diode pumped devices and may include Nd-doped or Yb-doped lasers. In the alternative, any number and type of laser sources including pulsed and quasi-CW fiber lasers and/or tunable laser systems may be used with the systems disclosed herein.

Optionally, the interacting laser beams have beam diameters (on the order of 1 mm) sized to require trade-offs among spatial beam overlap considerations including walk-off of the Poynting vectors associated with extraordinary polarizations and angular deviation of the wave vectors of the interacting beams.

DETAILED DESCRIPTION

Figure 1:
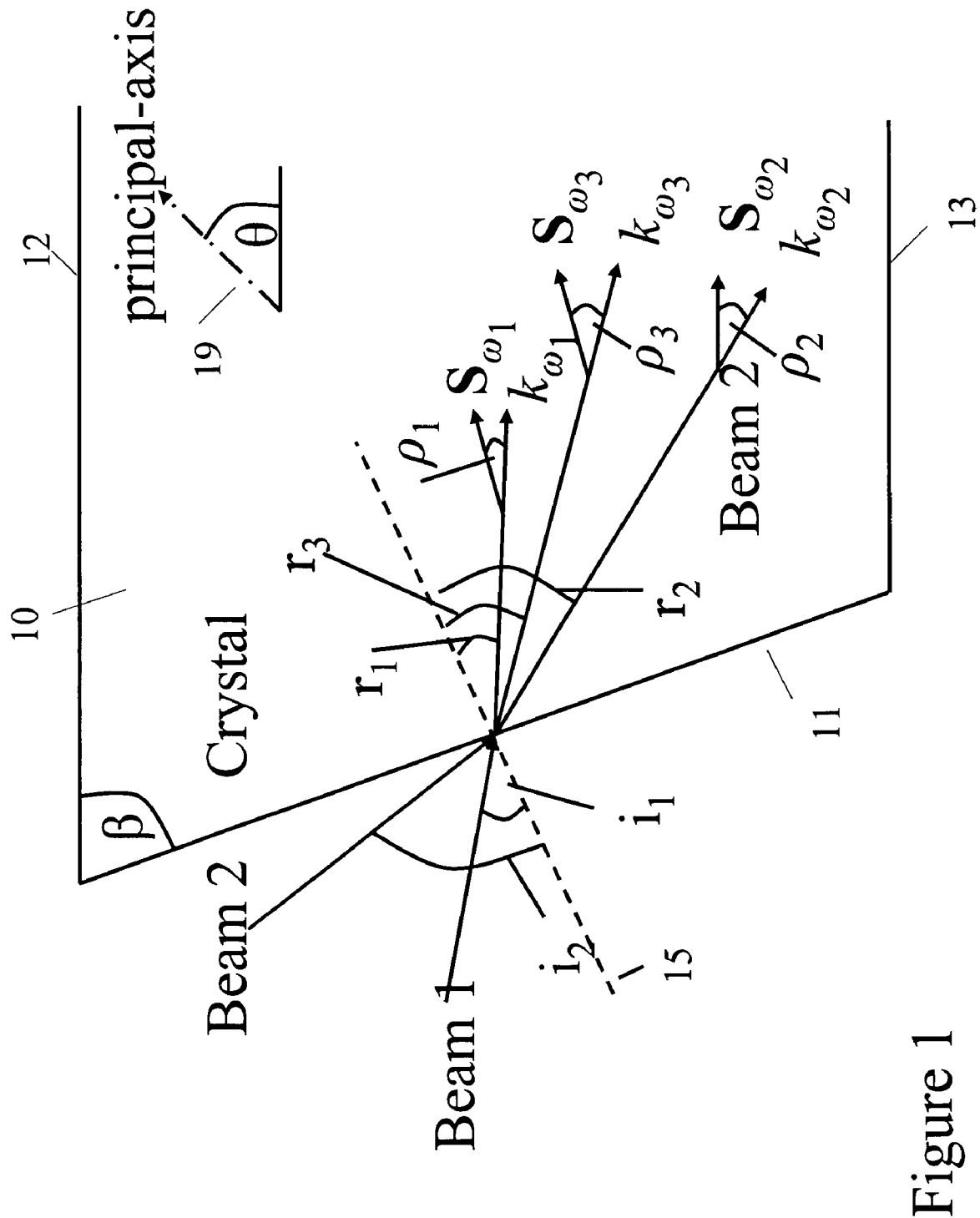
FIG. 1 is an illustration of a general case of SFM process in a non-linear crystal collinear PM.
Figure 2:
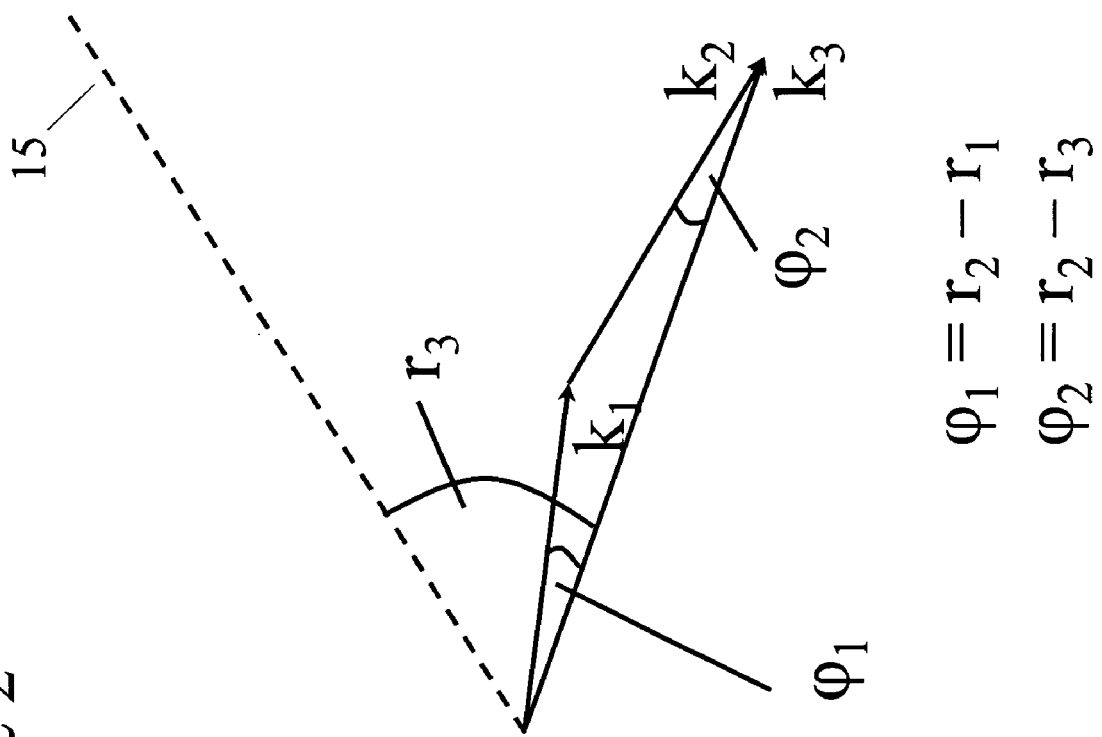
FIG. 2 is a diagram of non-collinear PM for a general case of SFM.

FIG. 1 illustrates a general case where two waves designated as beam 1 and beam 2 of different wavelengths corresponding to frequencies $\omega_1$ and $\omega_2$ and corresponding wave vectors $k_1$ and $k_2$ are incident on a nonlinear crystal 10, entering the crystal at respective angles of incidence $i_1$ and $i_2$ relative to the normal 15 to the surface 11. In this general case, both waves are shown as incident at angles that are oblique relative to the surface 11 of the nonlinear material 10, which, in this general case, is shown cut at some angle β. It is recognized that in most practical settings at least one of the beams may be selected to propagate at a direction parallel to the crystal's edges for ease of alignment. Following refraction the beams are shown propagating at angles $r_1$ and $r_2$ inside the crystal relative to the normal. Refraction is a well-known effect known to occur whenever a beam enters the input face of a material at an oblique angle of incidence. Generally, Snell's law relates the angles of incidence and the angles of refraction through the material's index of refraction on either side of the interface. Since the two beams are shown incident at two different angles deviating from normal, they will each be refracted by different amounts. As indicated in FIG. 1, the magnitude of the angles $r_1$ and $r_2$ is somewhat exaggerated for clarity of illustration, but it should be understood that typically, in most crystals with an index of refraction n>1, beams incident on air-crystal interface will be refracted towards the normal to the interface, so that the refraction angles are generally smaller than the corresponding incident angles. Assuming the crystal is cut for SFM at the interacting frequencies, a third beam of frequency $\omega_3=\omega_1+\omega_2$ is generated with the corresponding wave vector denoted $k_3$. The direction of $k_3$ is determined by the vector phase-matching condition $k_3=k_1+k_2$ as shown in the non-collinear PM diagram of FIG. 2, from which the angle $r_3$ can be calculated. In the most general case of SFM, all three beams are extraordinary waves and therefore have their associated Poynting vectors offset by angles $\rho_1$, $\rho_2$ and $\rho_3$ from the respective wave vectors. In one embodiment, at least one of the beams has ordinary polarization, in which case, the angle between its respective wave vector and Poynting vector vanishes.

Optimization of the conversion efficiency in a SFM process may require maximization of the effective interaction length. To achieve this condition, consideration may be given to the directions of the Poynting vectors, and will most often require that all the Poynting vector directions coincide. In principle, by carefully selecting, for a given non-linear process, the crystal wedge angle β, beam polarizations and the incident beams' angles relative to the crystalline axes the deviation between the different Poynting vectors may be minimized using a non-collinear PM configuration. Depending however, on the properties of the crystal, the incident wavelengths, and practical crystal availability and size considerations, such optimization may or may not be feasible in practical settings. In particular, there may be a trade-off between efficiency of conversion, phase-matching conditions (including crystal temperature and beam polarizations) and spatial overlap requirements between the three interacting beams, with the optimal trade-off depending on the specifics of the conversion process and feasibility of achieving the preferred PM conditions. Needless to say, the non-collinear PM case is considerably more complex than a collinear arrangement where the k-vectors of the incident waves as well as the resultant wave co-propagate along the same axis. Therefore, historically, the non-collinear PM configuration was utilized primarily in optical conversion processes where it provided the benefit of spatial beam separation, but was typically avoided in processes where such benefits were not clear and/or alignment and angular tolerances were critical. The one exception noted in the prior art is for the case of SHG of 1 μm radiation where a single fundamental beam was incident at an oblique angle on a crystal or the fundamental was split into two beams, which were made to cross at a crystal cut at typical angles. However, neither of these prior art arrangements provided means for optimizing conversion efficiency in the most general situations involving three wave interactions where all beams have different wavelengths and/or the crystal is oriented for other than Type-II PM. In this invention we identify and provide solutions to situations where a non-collinear PM geometry can provide improvements in terms of the overall conversion efficiencies for a general SFM case. We then further disclose conditions where selection of crystal cuts and non-collinear PM geometries can provide further practical advantages in terms of both efficiency and lifetime for specific interactions such as THG.

Figure 3:
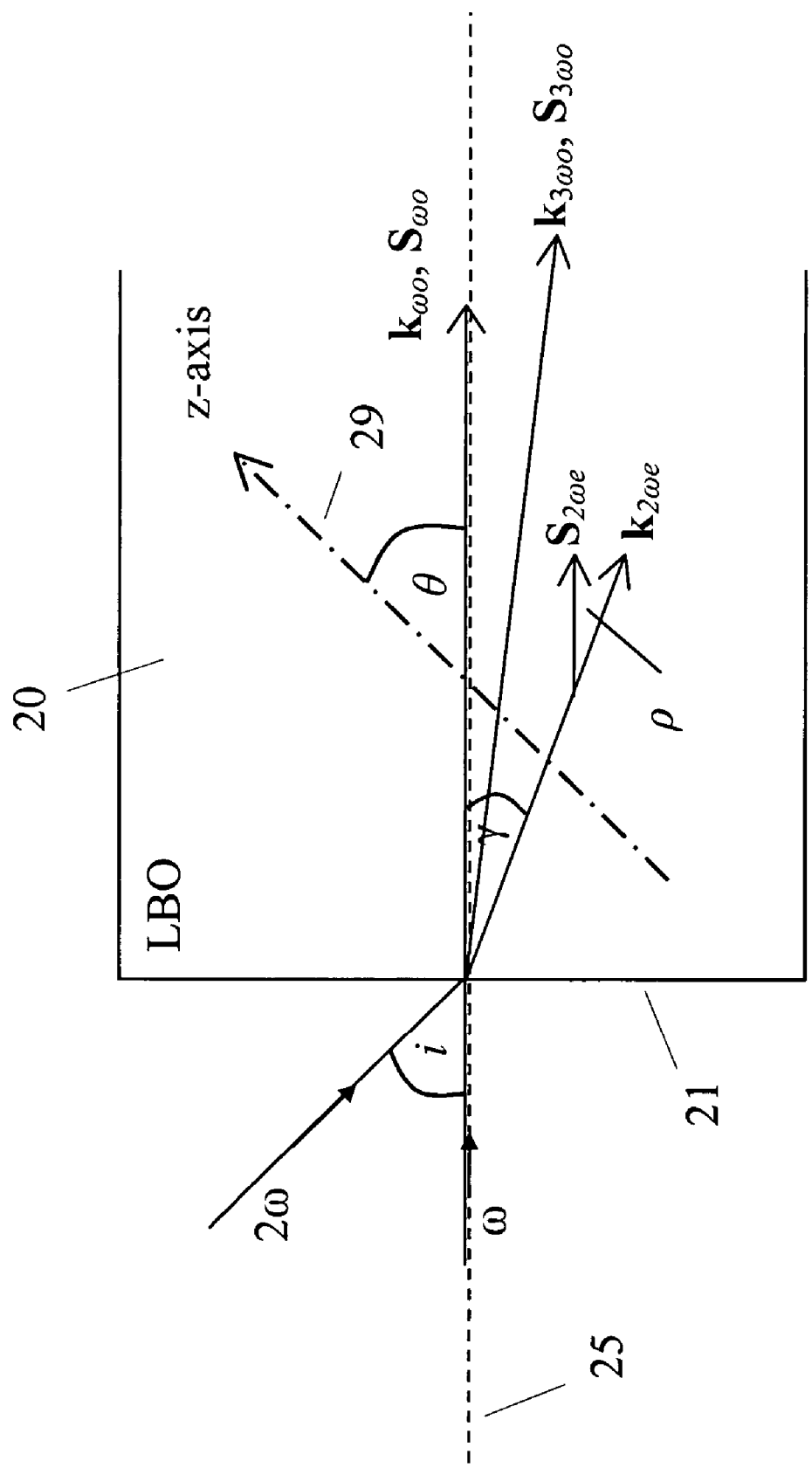
FIG. 3 is an illustration of a THG process with the fundamental beam incident on a crystal cut at normal angles and oriented for Type-II PM.

For the purpose of illustration, we show in an embodiment in FIG. 3 that is specifically applicable to THG, wherein a beam comprising a fundamental beam at frequency ω (corresponding to wavelength λ) and a SH beam at frequency 2ω (corresponding to wavelength λ/2) with an extraordinary polarization are incident on nonlinear crystal 20 with an angle i between them. The crystal 20 has at least a z-axis 22 oriented at angle θ to the normal 25 so as to produce a sum frequency mixed beam at frequency 3 (corresponding to wavelength λ/3). By way of an example, the tripler crystal 20 is shown in FIG. 3 with its face 21 cut normal to the direction of incidence of the fundamental beam, a common configuration chosen to illustrate the principles of the multiple wave mixing method and not by way of limitation. Furthermore, in this particular example, the fundamental wave is selected to have an ordinary polarization, while the SH beam has an extraordinary polarization, resulting in a TH beam also having ordinary polarization. This selection of polarizations is an example of a Type-II phase matching, which is one of the most commonly utilized arrangements for producing the TH beam of Nd-doped lasers using LBO as the nonlinear crystal. In the case of the standard gain media such as Nd:YAG and Nd:YVO$_4$, which emit fundamental radiation at 1064 nm, the TH is produced at 355 nm. However, any variety of output wavelengths may be generated based on the wavelength of the input signal. Following refraction at the crystal's face 21, the propagation wave vectors of the fundamental and SH waves denoted as k$_{\omega o}$ and k$_{2\omega e}$, respectively, are separated by angle γ. Note that in standard collinear THG, if the angle i between the incident beams is zero, i.e., the beams are incident normal to the crystal's face, the angle γ is also zero and the respective wave vectors are all collinear. For the non-collinear case however, note that each of the wave vectors is now pointed in a different direction, with the direction and magnitude of the TH wave vector k$_{3\omega o}$ derived from the non-collinear PM diagram shown in FIG. 4. For the Type-II PM example chosen in this illustrative case, the incident fundamental wave and the generated TH wave have ordinary polarization and are therefore characterized by a Poynting vector S$_{\omega o}$ and S$_{3\omega o}$ that are directed parallel to the respective wave vectors k$_\omega$ and k$_{3\omega}$. On the other hand, for the extraordinary polarized SH wave the Poynting vector S$_{2\omega}$ and the wave vector k$_{2\omega}$ are in general not collinear, and the angular separation between these two quantities is what is known as the walk-off angle, denoted in FIG. 3 as ρ. Thus, even in this relatively simple illustrative example of THG in a crystal cut for propagation of the fundamental in a direction normal to the surface 21, the Poynting vectors of the three interacting beams S$_{\omega o}$, S$_{2\omega e}$, and S$_{3\omega o}$ in the crystal all point in different directions, resulting in progressively reduced overlap between the beams as they traverse the crystal, leading to a shorter effective interaction length and, ultimately, lower conversion efficiency.

In the illustrative example of FIG. 3, where the crystal face 21 is normal to the direction of incidence of the fundamental wave, the angle of incidence i for the second harmonic wave can, in principle, be selected such that the refracted SH wave has the direction of its wave vector k$_{2\omega}$ offset from the normal (and the fundamental wave) by the walk off angle ρ (i.e., γ=ρ). Since the normal incident fundamental wave experiences no refraction the SH e-wave may walk back onto the fundamental o-wave as the two beams propagate through the crystal thereby maintaining optimal overlap throughout the length of the crystal. Note however, this walk-off compensation may not necessarily optimize the conditions for generating the third harmonic because the TH wave propagates away from the normal to the surface 25 by an angle α (shown in FIG. 4) relative to the direction of the fundamental wave vector kω, a direction which in the illustrative example of FIG. 3 coincides with the normal to the crystal face, as a result of the non-collinear nature of the three-wave interaction as dictated by the PM conditions for the THG process shown in FIG. 4. Since optimization of the interaction requires that the overlap for the direction of the energy flow for all three interacting waves be maximized, the angle γ between the SH and the fundamental wave vectors k$_{2\omega}$ and k$_\omega$ should be selected such that this condition is best fulfilled. As such, the optimal arrangement does not necessarily require precise matching between the angle γ and the walk-off angle ρ. In one embodiment, the solution may involve an angle α that is somewhere between γ and ρ. In the case of THG, the condition can be expressed as α≦γ≦ρ regardless of the particular doubling crystal. As such, an optimal configuration may provide only partial compensation of the Poynting vector, i.e., perfect walk-off compensation of the SH may be sacrificed in order to assure better overall overlap between all three interacting beams.

Setting the angle of incidence such that the walk-off angle is compensated for (e.g., in a Type-II PM situation) may provide optimal conversion efficiency provided that the respective beam diameters of the interacting waves are large enough to maintain sufficient overlap between three non-collinear beams throughout the crystal length, for example, during SHG where the two incident beams have identical wavelengths. It should however be recognized that the walk-off compensation could be achieved in some cases by tilting the crystal's face at an oblique angle relative to the incident beam was the result of a fortuitous coincidence of the birefringence and PM parameters of the selected KTP crystal, and was applicable only to the simple process of SHG where the angular deviation between the k-vectors are rather small. Unlike the method described herein, Nightingale's technique did not however anticipate the more complex requirements which characterize the general case of SFM, where numerous additional considerations must be taken into account, including the fact that not only may there be a walk-off for one or more of the interacting beams but the wave vectors may be substantially offset from one another with their directions determined by non-collinear PM conditions. In some cases, the wave vector offset may be on the same order or even larger than the walk-off angles which are dictated by the degree of birefringence of the crystal. In other cases, the birefringence of the nonlinear crystal may result in a walk-off angle that is so large as to preclude application of Nightingale's or other similar prior art PM techniques. In particular, considerations of wave vector overlap were completely ignored in Nightingale's prior art approach where an oblique crystal cut could be found for the special case of LBO oriented for Type II-doubling of 1064 nm beams such that the walk-off of the extraordinary component of an incident fundamental beam could be exactly compensated, even as the crystal was reoriented to maintain the phase matching angles relative to the crystal's axes. In fact, cutting the crystal face at an angle oblique to an incident beam is not even applicable to SHG interactions other than Type II-PM. For example in Type I-PM, it may be the extraordinary polarized output beam that experiences the walk-off, rather one component of the incident beams, and this walk-off cannot be compensated by oblique orientation of crystal input face.

The present application thus teaches that optimization of the conversion efficiency requires properly arranging the angles of incidence of the interacting beam(s) relative to the input crystal face in tandem with selecting suitable crystal orientation and crystal temperature so as to preserve the requisite PM conditions. These conditions are further underscored by key beam characteristics, including the incident beams' wavelengths and relative power mix. Other beam properties such as divergence, roundness and spot sizes play an important role in determining optimal PM configurations, especially in a non-collinear set-up. The methods disclosed herein therefore comprise optimization of the conversion efficiency using an analysis unique to each SFM process/nonlinear crystal combination. The analysis enlarges the parameter space to include non-collinear PM, with due consideration given to practical limitations such as available crystal sizes and ovens, as well as optimal non linear coefficients and requisite beam diameters, output beam quality and crystal lifetime issues. This process optimization procedure results in a set of criteria identifying appropriate crystal cuts and preferred types of PM, temperature of crystal operation and angles of incidence. Experimentation may be used as part of the procedure to establish the most optimal, practical and efficient configuration suited to converting the frequency of specific laser systems.

Typically, the first step in optimizing the conversion process involves selecting the crystal orientation and type of PM appropriate for the desired input and output beams' wavelengths. This step utilizes data on crystal parameters as is customary in the art. Next, the walk-off angle(s) for each extraordinary beam are calculated using the well-known relation:

$$\rho(\theta) = \pm \arctan[(n_o/n_e)^2 \cdot \tan(\theta)] \mp \theta \qquad (1)$$

where $\theta$ is the angle between the propagation k-vector of the beam and the principal axis of the crystal which is uniquely selected for a given PM condition.

The non-collinear angle between the interacting beams inside the crystal can then be selected based on a desired deviation from the walk-off angle as determined from experimental and theoretical optimization of the process efficiency given available beam characteristics such as beam diameters and divergence, and possibly the PM temperature. The non-collinear angle determines in turn the angles $\theta(\lambda)$ of the three interacting beams relative to the principal axis, using calculated PM curves appropriate for a non-collinear configuration. These angles prescribe the crystal cut and orientation relative to the principal axes for a given temperature of operation. Standard crystal cuts and the commercial availability of suitable ovens are additional criteria that may be used to dictate the most appropriate choices, with preference given to commonly available crystals and oven constructions. Once the optimal PM configuration and operating temperature are selected, the angle between the interacting incident beams is derived using an application of Snell's law based on known indices of refraction appropriate for each wavelength and polarization state.

Figure 5:
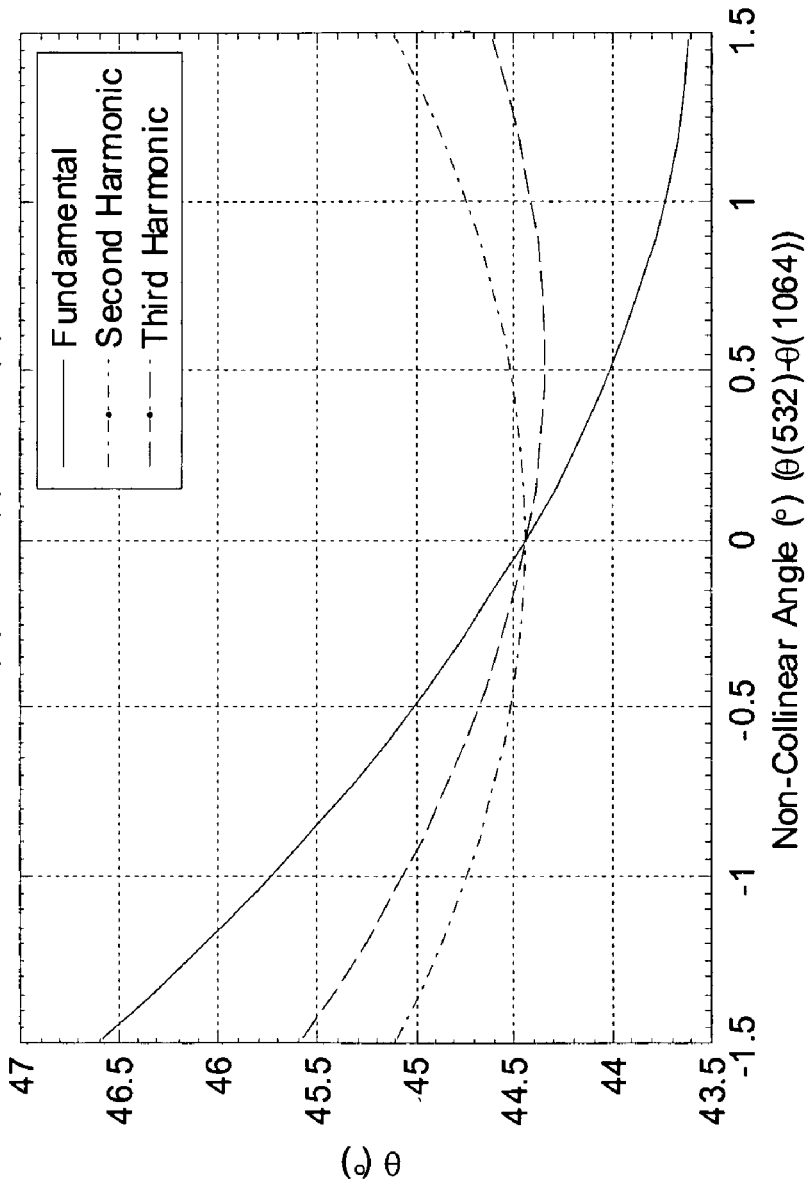
FIG. 5 shows the dependence of the phase matching angle θ as a function of the walk-off angle for Type-II interaction in LBO oriented (in the y-z plane) for generating the a third harmonic of 1064 nm.

For the earlier illustrative example of THG of a fundamental beam at 1064 nm shown in FIG. 3, LBO represents a desirable non-linear crystal of choice as it is already used commonly with Nd-doped lasers such as Nd:YAG or Nd:YVO4 due to a combination of favorable properties, including non-linear coefficient, robustness and ready availability in various cuts. For a Type-II interaction in the (y,z) plane using the z direction as the principal axis, and heating the crystal to a temperature of 58° C., the walk-off angle □ can be calculated from Eq. (1) as 0.55°. The non-collinear angle γ between the interacting fundamental and SH beams is then selected based on process optimization considerations, as mentioned above. The PM angles $\theta(\lambda)$ of the three interacting beams are next derived using standard Sellmeier equations and plotted as a function of the non-collinear angle γ. FIG. 5 shows an example of curves illustrating the dependence of the PM angles on γ for the case of an LBO crystal cut for Type-II mixing of a 1064 nm fundamental and a 532 nm SH beam in the (y-z) plane to thereby produce a TH beam at 355 nm. The curves shown in FIG. 5 are appropriate to an LBO crystal operated at a PM temperature of about 58° C., assuming perfect PM. It is understood that different sets of curves will generally be obtained for different temperatures of operation and/or alternative orientation of the crystal axes. As indicated in FIG. 5, the curves for the three beams cross at angle γ=0, corresponding to the collinear case. For any configuration deviating from collinear PM, selection of a particular non-collinear angle γ dictates the angles $\theta(\lambda)$ for each of the three beams. For example, setting γ=ρ=0.55°, the calculated walk-off angle for the extraordinary SH beam in a Type-II PM configuration, FIG. 5 yields θo(1064 nm)=44.00°, θe(532 nm)=44.55°, and θo(355 nm)=44.37°. Since the extra-ordinary refractive index for θ(532 nm)=44.55° is ne(θ=44.55°) =1.61377, the angle of incidence i can be derived through simple application of Snell's law, giving i=0.8876°. Note that this angle corresponds to a crystal cut at the standard 44° angle but the PM temperature is now set to be about 58.25° C.—which is about 8° C. higher than the standard 50° C. PM temperature for the collinear PM case. Since available ovens can readily handle operation at this temperature, it is possible to optimize this particular THG process using walk-off compensation through non-collinear PM.

The above example corresponded to a situation where walk-off compensation is achieved such that the Poynting vectors of the fundamental and second-harmonic waves in the crystal are collinear and parallel. However, as stated earlier, this may or may not represent a truly optimized conversion process since the wave vector directions are still different, potentially resulting in reduced overlap between the three beams. Thus, alternative embodiments of the THG process may involve compromising perfect walk-off compensation in return for providing better overlap with the third harmonic wave. Such a situation corresponds to choosing a non-collinear angle somewhere between zero degrees and ρ. This is apparent from inspection of the non-collinear PM diagram of FIG. 4, which indicates that smaller γ results in smaller α, i.e., decreased deviation of the TH k-vector direction from that of the fundamental. The angle γ is therefore seen as a measure of the degree of non-collinearity of the interaction. Generally, larger beam diameters allow for greater non-collinear angles without overly sacrificing beam overlap. Further increasing the beam size in an effort to maintain better overlap throughout the crystal length, can exact a penalty in terms of the conversion efficiency, which is known to have a near quadratic dependence on the beam power densities. There is, therefore, a trade-off between the different aspects of the conversion process, requiring careful consideration of a plurality of beam parameters coupled with nonlinear crystal characteristics, such consideration being generally unique to each frequency conversion case.

By way of another illustration of the trade-offs associated with walk-off compensation schemes based on non-collinear PM configurations, it must be pointed out that walk-off compensation is not always possible, due to practical considerations. For example, there are non-linear crystals such as BBO and CLBO where large inherent birefringence values may prevent practical implementation of walk-off compensation schemes using oblique crystal cuts. For example, in the case of a THG process in CLBO, which has been used successfully to generate UV radiation both at 355 nm through a rather large walk-off angle of 1.93° is obtained.

Figure 6:
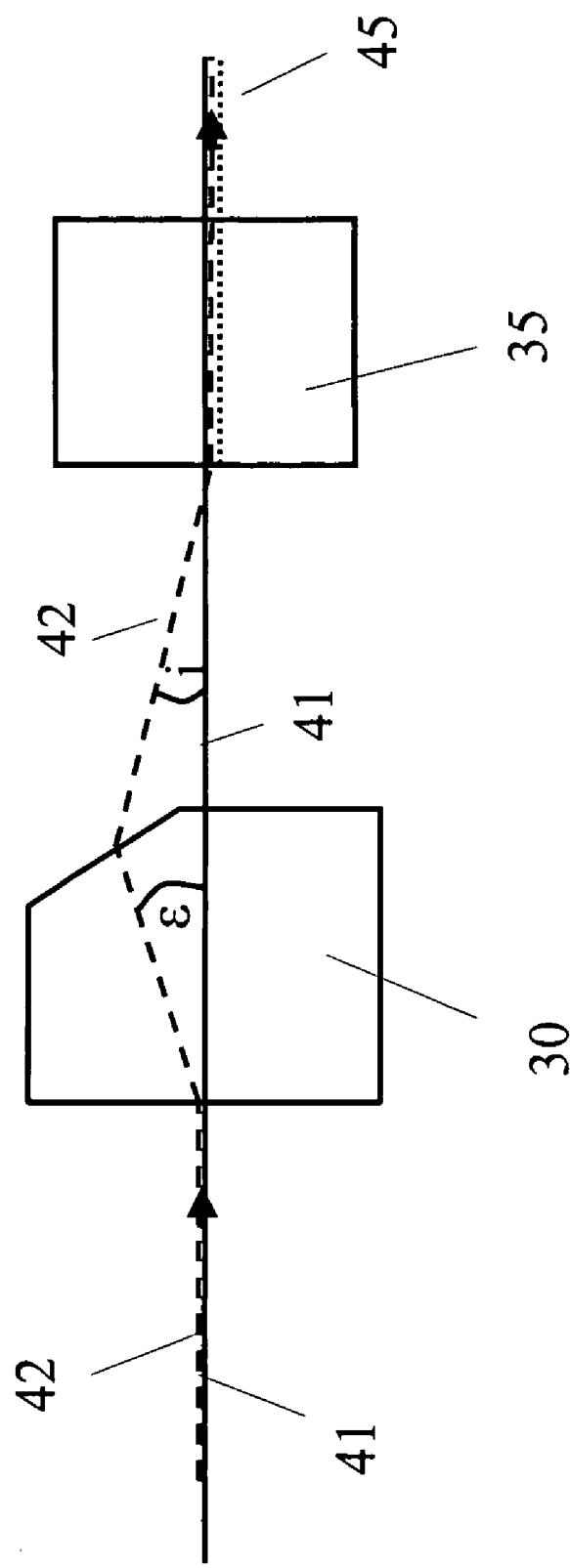
FIG. 6 is a schematic showing a technique for achieving angular separation between incident beams of orthogonal polarizations using a biprism made of a birefringent material.

Achieving the desired non-collinear angle between the incident beams is another point of novelty included in this application. In particular, as the LBO example above illustrated, the calculated angle between the incident fundamental and the SH beams can be rather small—less than 1° in this case. Such a small intra beam separation can be difficult to achieve in practice using conventional optics. In one approach, a prescribed angular separation between orthogonally polarized beams utilizes a biprism comprising a birefringent material 30, as shown in FIG. 6. The separation angle i between two beams 41 and 42 may thus be chosen to provide the requisite pre-compensation of a Poynting vector walk-off in non-linear crystal 35 oriented to generate SF wave 45. In the illustration of FIG. 6 it is assumed that the two co-propagating beams 41 and 42 incident on the biprism 30 are orthogonally polarized. These beams may have the same or different wavelengths. Note that such beams may, for example, be generated in a non-critically phase matched crystal oriented for doubling a fundamental beam 41, resulting in two beams: a SH beam 42 and a residual fundamental 41. In a Type-II NCPM situation, walk-off is negligible and the output beams are an ordinary polarized fundamental and an extraordinary polarized SH beam. Such a configuration is commonly selected, for example, in frequency doubling 1064 nm radiation in an LBO crystal.

In order to separate the directions of incidence of the two beams, advantage may be taken of the fact that the index of refraction of the two polarization states is, in general, different in birefringent materials, an effect sometimes referred to in the literature as double refraction. The magnitude of this effect is governed by the degree of birefringence of the material and depends on the orientation of the interface relative to the crystal axes and the angle of incidence of the incoming beams. Thus, by taking advantage of the double refraction effect and wedging a corner of a birefringent crystal, a biprism is effectively created which may act as a beam displacer, generating exactly the desired angular separation between two beams of orthogonal polarizations. The length of the biprism material may be chosen so that a reasonable practical distance separates the beams after propagation through the crystal and the angle of the wedge determines the angular separation of the output. As shown in FIG. 6, corner 31, where the SH e-wave exits the crystal is wedged, resulting in modifying the angular separation between ordinary and extraordinary beams from an angle ϵ inside the biprism material to angle i outside. The angle can therefore be selected to correspond to the incidence angle appropriate to non-collinear SFM process in the nonlinear crystal 35, resulting in optimal conversion to the SF wave 45.

Figure 7:
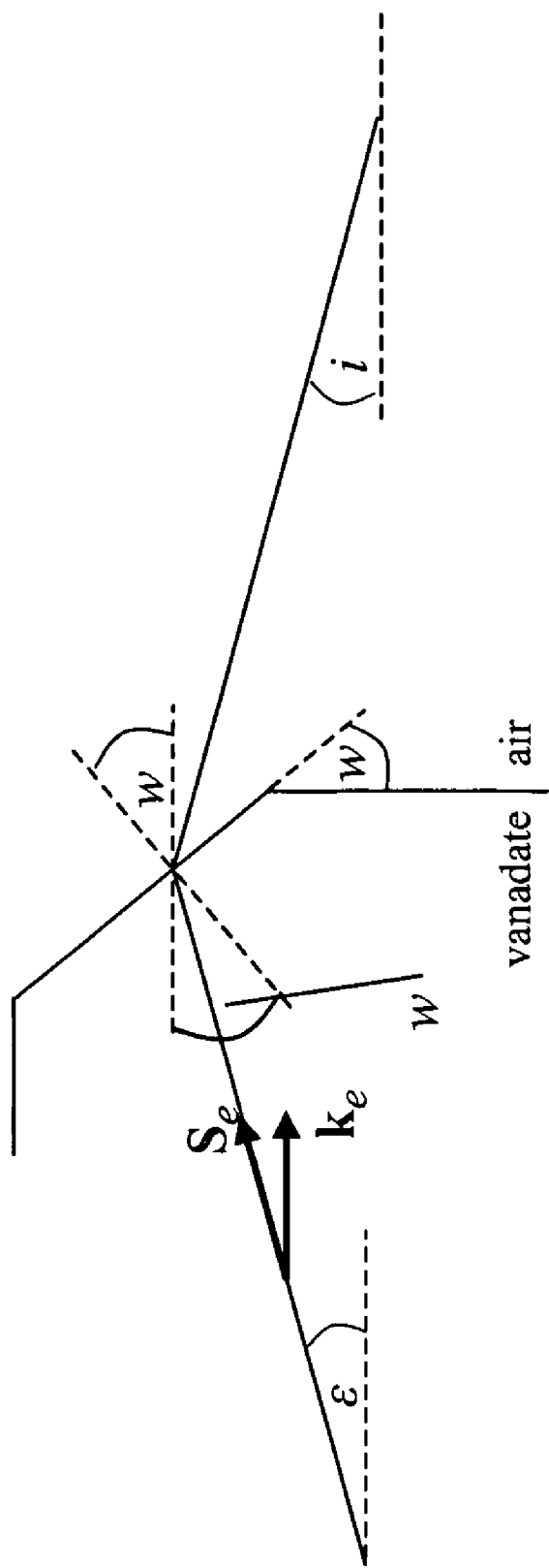
FIG. 7 depicts a geometric construction for determining wedge angle of the biprism of FIG. 6.

FIG. 7 shows the geometric construction for determining the wedge angle w assuming angular separation e between two orthogonally polarized beams 1 and 2 inside a birefringent material, such as crystal 30 shown in FIG. 6 above. The angular separation is uniquely determined based on known indices of refraction ne and no for extraordinary and ordinary-polarized waves, and the incident beams' wavelengths and the orientation of the crystal's optic axis relative to the direction of propagation.

In one example, Vanadate has been identified as a material appropriate for use as a displacer using this technique because it has one of the largest know birefringence values for crystals that are transparent across a wide spectral range from the UV to the near infrared. This material can be effectively used for example to separate the 1064 nm fundamental and 532 e-polarized SH generated by a SHG process in Type-II LBO. Assuming the incident beams propagate at 45° to the optic axis in a Vanadate biprism (representing the standard cut for beam displacers made from Vanadate), and with the value ne(θ=45°) at 532 nm equal to 2.1785, the separation angle inside the crystal is calculated as ϵ=6.21540, with the SH e-polarized beam displaced towards the optic axis. For a desired angular separation angle i (at the exit from the biprism crystal) and for small angles, the wedge angle can be calculated from the geometry of FIG. 7 according to:

$$w \approx \frac{i_{LBO}}{n_e - 1}$$

For example, setting iLBO=0.8876° (an angular separation corresponding to the THG example of FIG. 3) and with ne=2.1785 for Vanadate biprism, the wedge angle is calculated to be equal to 0.753°. This means that with a 1 mm diameter beam (typical of the output of diode pumped solid state lasers) the Vanadate biprism crystal must have a length of about 9.2 mm to provide a separation of 1 mm on the exit end of the crystal. The Vanadate exit face would, in this case, have to be about 65 mm away from the entrance face of the tripler in order to allow the two incident beams to be recombined at the nonlinear crystal's location. If more beam separation is required (for example, in case the beam diameters are larger), the Vanadate biprism length could be increased to, e.g., 12 mm. This would increase the separation at the Vanadate exit face to about 1.4 mm, but would then increase the propagation distance to the tripler crystal at least 92 mm.

Although a Vanadate birefringent crystal displacer was used in the above example, it is understood that there are other materials suitable for achieving the requisite angular displacement between incident beams and such materials are known in the art of optics design. Similarly, although the example of a birefringent crystal displacer was used in the above example, it is understood that there are other approaches for achieving the requisite angular displacement between incident beams and such techniques as are known in the art of optics design. Such techniques may include dichroic and/or polarizing beam splitters used in various combinations. For example, in the case of SHG with either Type-I or Type-II PM, the fundamental beams may be split into two components using a beam splitter followed by one or more deflectors set up as required to provide a requisite angular separation between the two beam components. If the crystal is oriented for Type-II PM, the beam splitter may be used to obtain two components with orthogonal polarizations from a single unpolarized or elliptically polarized beam. For Type-I PM a beam splitter may a used to provide angular separation between two identically polarized components of a single linearly polarized beam using optical arrangement well known in the art of laser system design. In the case of SFM of two different wavelengths, including the special case of THG, dichroic beam splitters may be used instead to separate the directions of two incident beams. It is noted that although many such optical arrangements are known, the possibility of using a single biprism made of a suitable birefringent material is attractive because of the simplicity of this arrangement and the ensuing ease of alignment.

It is further pointed out that whereas angles calculated for the specific THG example assumed an incident angle corresponding to perfect walk-off compensation in the tripler, this example was provided by way of illustration only and not by way of limitation. In fact, as was described above, in many practical situations involving optimal conversion efficiency in THG or more generally, SFM, the angle of incidence i may be selected so that the refracted angle γ deviates from the walk-off angle ρ by a pre-determined amount δ, based on optimization calculations and measurements. Thus, the geometric construction of FIG. 7 may have to be modified accordingly to provide the requisite displacement angles.

Figure 4:
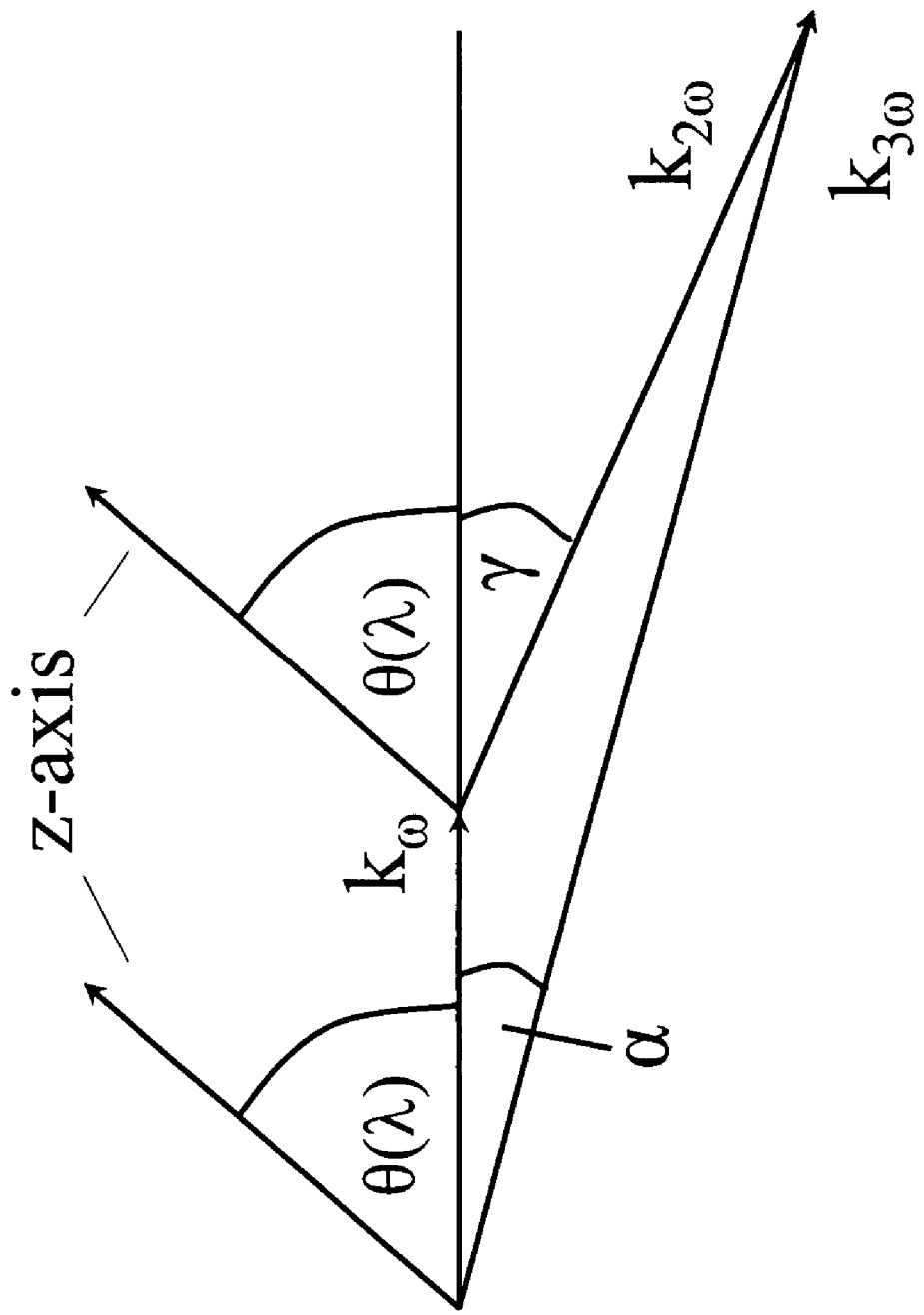
FIG. 4 is a non-collinear PM diagram appropriate to the THG configuration of FIG. 3.

In general, there are two alternative approaches for implementing the efficiency optimization approach disclosed herein either of which may be used in the efficiency enhancement and walk-off compensation schemes as described above. The first approach utilizes an optical system such as a biprism of FIG. 6 to alter the direction of incidence (identified here with the k-vector) of one of the two beams incident on a nonlinear crystal such that the two incident beams are separated by a pre-determined angle. The crystal in this case is assumed to be cut in the standard manner, i.e., with its face at right angles and with the normal to the face coincident with the propagation direction of at least one of the incident beams. The second approach provides the internal separation between the incident beams required for non-collinear PM by cutting the input face of the nonlinear crystal at an oblique angle relative to the propagation direction. The two approaches may, of course, be combined to give the most general case shown in FIG. 1. Typically, one of the two approaches above is selected. The first approach was discussed by way of illustration in its application to a THG process as shown in FIGS. 3 and 4. The second approach is now discussed using a similar illustration.

Figure 8A:
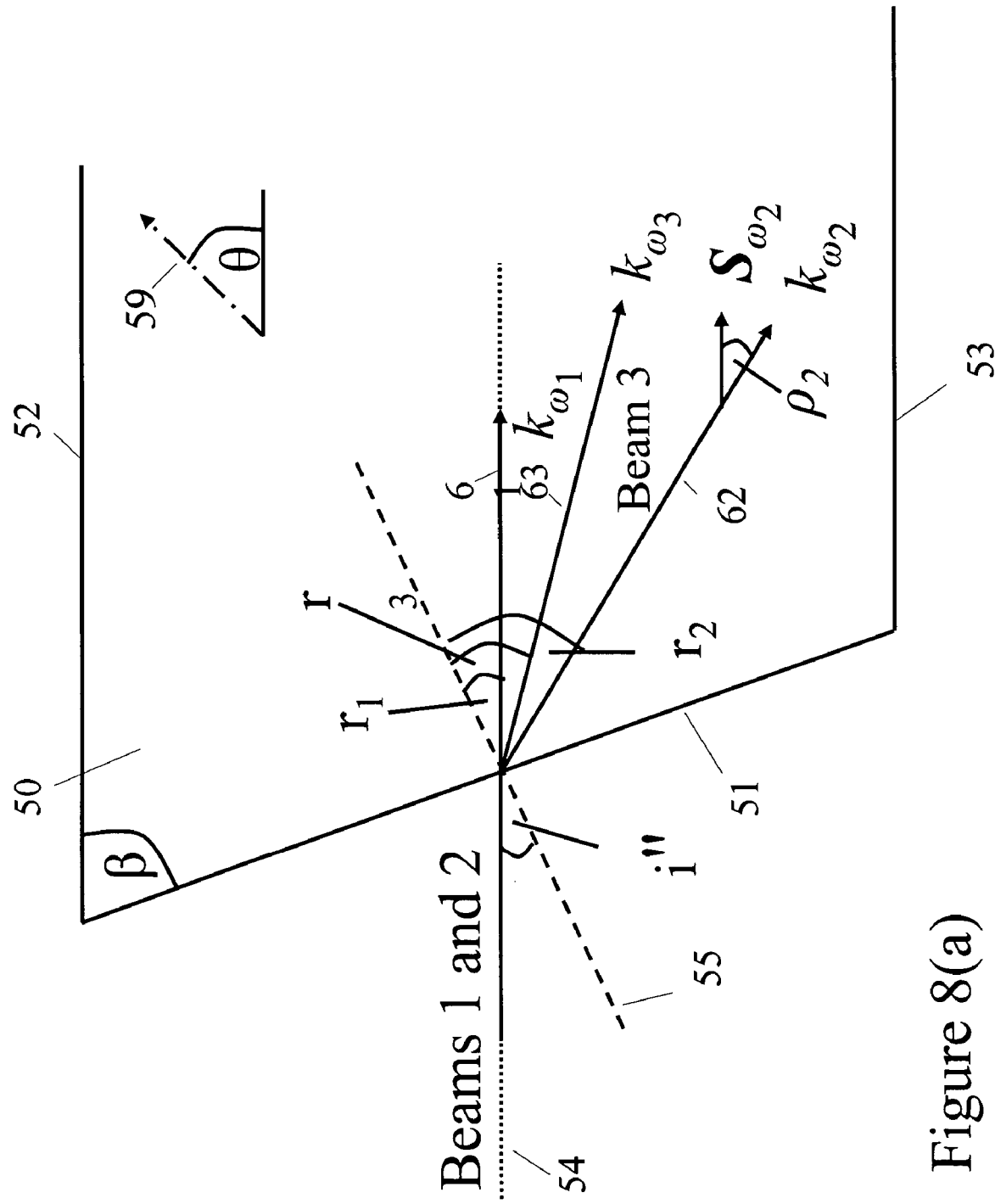
FIG. 8(a) illustrates an optical configuration for a generic three-wave Type-I interaction process using co-propagating beams incident on a nonlinear crystal with a wedged input face. The angles indicated in the figures are exaggerated for the purpose of clarity.
Figure 8B:
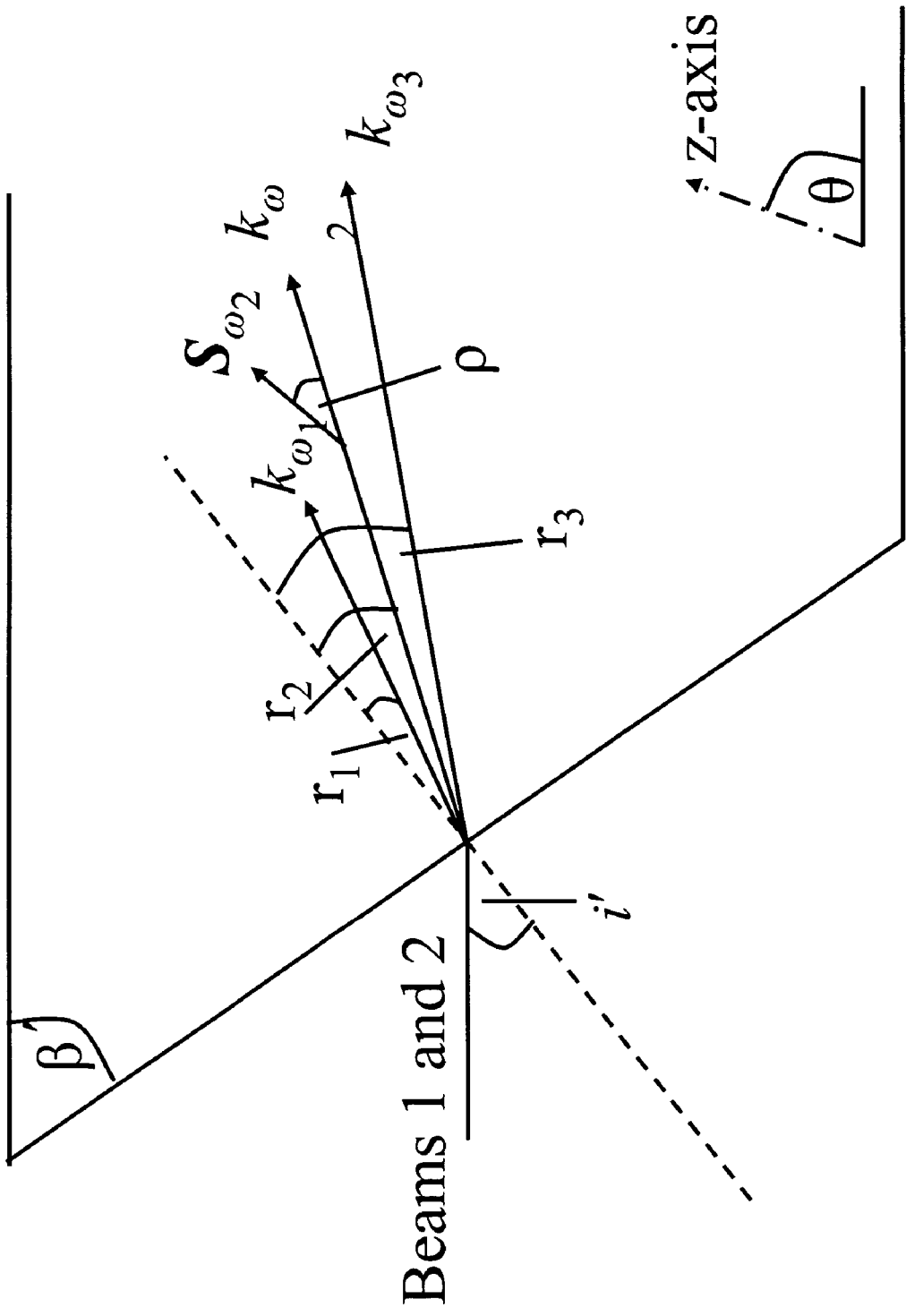
FIG. 8(b) illustrates a typical Type-I SFM process with co-propagating incident beams, non-collinear PM and a wedged crystal.

FIG. 8(a) shows an example of a crystal 50 cut with its face 51 at angle □ relative to the direction of incidence of two beams 1 and 2 with corresponding frequencies ω1 and ω2. This is again, a simplified case relative to the general case of FIG. 1 as now the two incident beams are assumed to be co-propagating in a direction 54 that defines an angle i' relative to the normal 55 to the crystal face 51. The two incident beams are refracted with angles r1 and r2 relative to the normal and the SF beam 3 is generated with a wave vector kω3 determined by non-collinear PM requirements as was done before. Again, it is noted that the magnitude of the angles r1 and r2 in FIG. 8(a) are exaggerated for clarity of illustration, and it is understood that typically the refraction angles are smaller than the corresponding incident angles. A more realistic depiction of the geometry with co-propagating incident beams and a crystal cut with a wedge angle β' is shown in FIG. 8(b). The geometry in FIG. 8(b) may be representative of an LBO crystal cut for THG and Type-II PM with ordinary polarized incident beams at 1.064 nm and 532 nm and extraordinary polarized TH beam at 355 nm. In this case, there will be a walk-off between the Poynting vector Sω3 and the k-vector kω3. For simplicity, both FIGS. 8(a) and 8(b) show the direction of incidence 54 as parallel to the plane defined by parallel faces 52 and 53 of a crystal 50. In this situation, the angle of the crystal cut (β in 8(a) or β' in 8(b)) represent the only geometric degree of freedom and its selection is determined by the same criteria needed to optimize the conversion efficiency in a non-collinear PM configuration as discussed above.

Figure 8C:
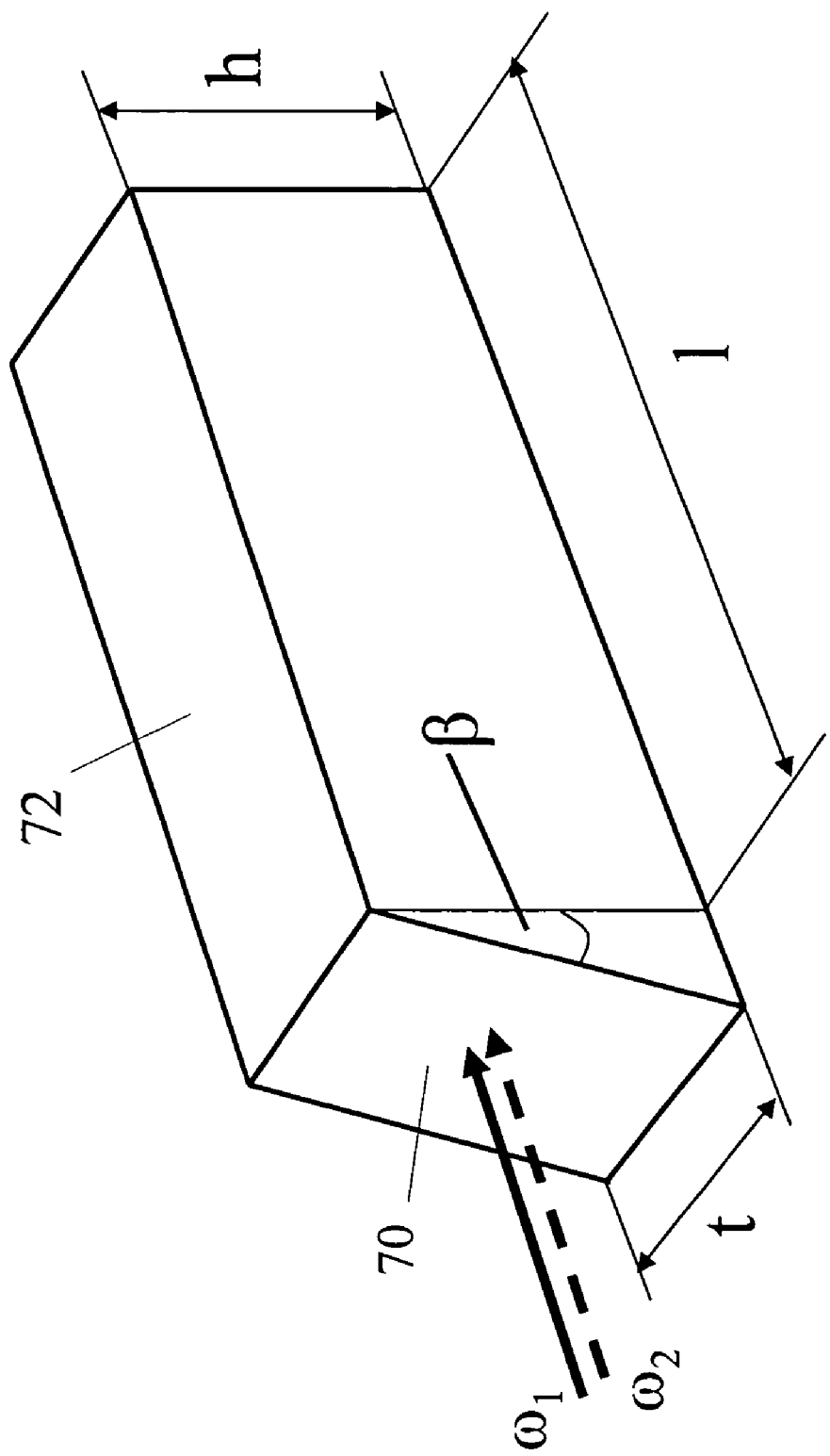
FIG. 8(c) is a perspective drawing of a wedged nonlinear crystal.

FIG. 8(c) gives a three-dimensional perspective of a nonlinear crystal with length l, thickness t and height h, cut with a wedge on its input face. In this example, the wedge angle is indicated as β and the top and bottom faces are parallel to better correlate with the geometry of FIG. 8(a) or 8(b). Though not shown in FIG. 8(c), it is understood that the back, or exit face of the crystal may also be wedged (though not necessarily at the same angle β) for ease of alignment and/or to prevent optical feedback.

Note that although the two input beams with frequencies ω1 and ω2 are indicated as incident on the input face 70 in a direction parallel to the major axis (i.e., parallel to the top and bottom faces 72 and 73), the arrangement selected in practice may require tilting the crystal relative to the input beams. This is commonly done in order to make maximum use of the crystal's clear aperture. One consequence is that both temperature and incidence angle may need to be adjusted in order to maximize the conversion efficiency in each case. Of course, altering the PM temperature and/or crystal cut (angle relative to the principal axis) means that the optimal wedge angle β may also have to be re-adjusted in order to maintain optimal performance. This highlights the one advantage that an approach using crossed incident beams has over the approach utilizing a wedged crystal with a-priori determined wedge angle, namely, it is easier to adjust the angular separation between input beams than it is to cut a new wedge angle. On the other hand, once the optimal conditions for conversion—including beam separation angle, PM requirements and crystal dimensions—are precisely known, use of a single element comprising a wedged crystal represents the lowest loss and most economical technique with minimal parts count and the fewest number of optical surfaces.

Figure 9:
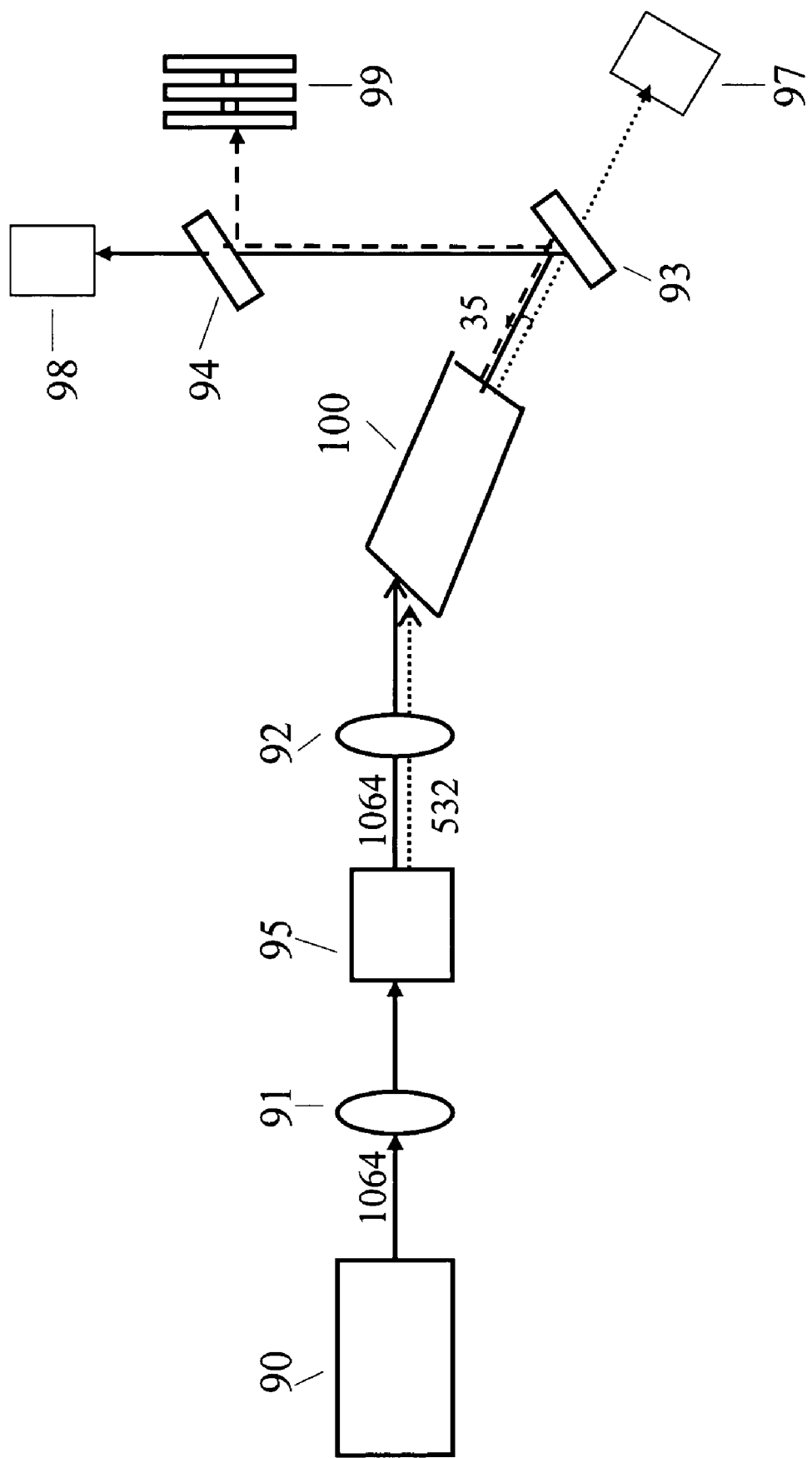
FIG. 9 is a schematic of an experimental set-up designed for THG of pulsed or mode locked radiation from a solid-state laser.

Experimental investigations were carried out to validate the advantages conferred by the methods of the invention. Given the high level of interest in industrial applications using pulsed UV beams, THG processes which produce 355 nm radiation from commercially available diode pumped Nd solid state lasers are of particular interest. FIG. 9 shows an example of an experimental set-up designed to identify conditions for optimizing the UV output produced by frequency tripling radiation from a Q-switched or mode locked diode pumped 1064 nm laser 90. In this example, fundamental radiation of known average and peak power, is first focused by a focusing element 91, such as a lens, into a doubler crystal 95, resulting in output at both 1064 nm and the SH at 532 nm. A second element 92—which may again comprise a single or a set of lenses—focuses both wavelengths into a tripler crystal 100 that is fabricated according to the principles of the invention. The resultant TH output at 355 nm may then be directed using tilted dichroic elements 93 and 94 to a detector 99 to determine the beam characteristics. Typically, the detector 99 comprises a standard power meter. Portions of the UV beam may be further split to measure other beam parameters such as beam quality and/or pulse duration, as is commonly done in characterizing the output of lasers. The dichroic elements are typically coated to direct the residual fundamental and SH beams to beam dumps 97 and 98. As shown in this figure, an approach using a wedged tripler crystal is selected, with the crystal tilted relative to the input beams at 1064 and 532 nm by an adjustable amount so as to maximize the clear aperture while optimizing the conversion efficiency. LBO is a standard crystal for both doubler and tripler with high quality crystals commercially available at various cuts and coatings of choice. One preferred approach utilizes LBO oriented for Type-II NCPM as the doubler, which nearly eliminates walk-off issues for the SHG process. The NCPM configuration in LBO is achieved at a temperature of 150° C. which is readily produced using available oven designs. For the tripler, LBO cut for Type-II PM and with a wedged input face a may be selected as was discussed previously, e.g., in connection with FIGS. 8(*a*) through 8(*c*). The tripler LBO is placed in an oven, which allows adjusting the PM temperature. The angular orientation of the crystal beam relative to the input beams may also be altered using a suitable stage. Following practices well known to those skilled in the art of harmonic generation, the LBO tripler crystal may be both angle and temperature tuned in order to optimize the output power in the UV. In experiments conducted using the set-up of FIG. 9, a variety of LBO crystals cut with different wedges and of different lengths were tested to validate the assertions made using the non-collinear PM procedures and principles outlined in this disclosure.

Figure 10:
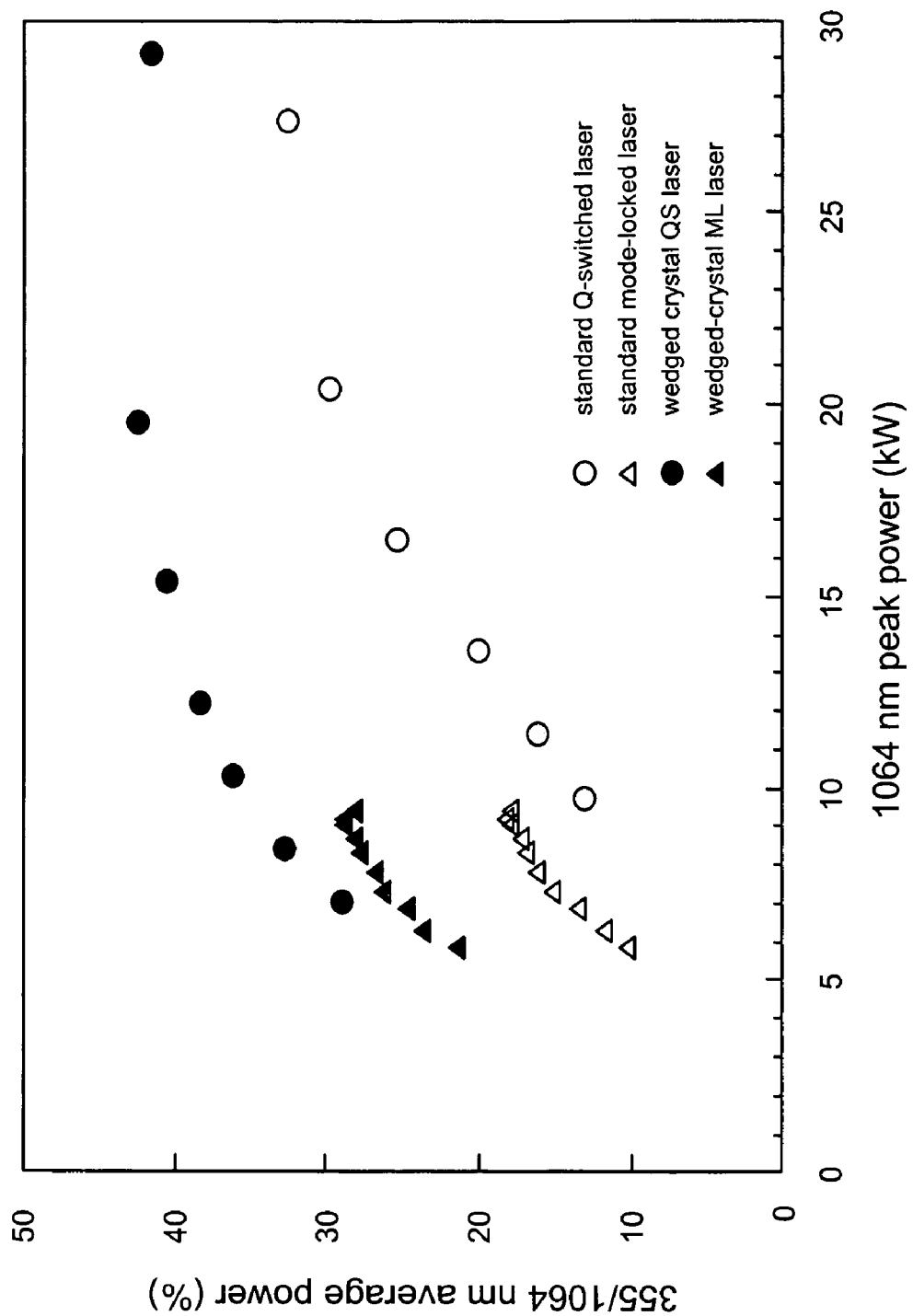
FIG. 10 shows a plot of preliminary results obtained from THG experiments using Q-switched (QS) laser and a mode locked (ML) laser, demonstrating the improved harmonic conversion efficiency using optimization schemes of the invention.

Thus, in one set of experiments using a mode-locked Nd:YVO4 laser and LBO doubler and tripler crystals, it was found, for example, that a wedge angle corresponding to β of about 16° gave optimal results using a crystal cut of about 43.7° relative to the z-axis while tilting the crystal so that the input beams form an angle of approximately 28° with the crystal's major axis (the z-axis in the case of the tripler). With these parameters a PM temperature of about 46° C. was found to be optimal. The results are shown in FIG. 10 where the plot (marked by filled triangles) of the harmonic conversion efficiency against the peak power indicates a maximum conversion efficiency of nearly 30% at peak power 8-9 kW. Such peak powers are characteristic of mode locked Vanadate laser which has pulse widths of about 12 ps operated at or near 80 MHz. The maximum efficiency of 30% represents nearly a factor of 2 improvement over the efficiencies obtained from a standard THG set-up using LBO tripler in a collinear PM configuration without the harmonic enhancement features of the invention, as represented in FIG. 10 by the plot with the open triangles. The roll-over shown in these plots is attributed to changes in the power balance between the incident beams and variations in the beam characteristics resulting from different operating conditions of the source laser, as is typically observed in harmonic conversion with high repetition rate and mode locked lasers.

In another set of experiments using a standard 12 W Q-switched Vanadate laser with about 12 ns pulse duration, the LBO tripler crystal designed and operated using the principles of the invention again gave a substantial improvement in the THG efficiency which was seen to increase from just under 30% at 20 kW for a standard LBO tripler configuration (plot with open circles in FIG. 10) to over 40% using the wedged crystal set up to provide optimal beam overlap in a non-collinear PM arrangement (plot with filled circles) at the same peak power. It is noted that although the efficiency of conversion appears to reach a maximum at about 42% conversion at a peak power of 20 kW (corresponding to operation at 50 kHz) some additional increase to over 45% may be possible by optimizing the SH-to-fundamental power mix and using a slightly longer LBO tripler crystal.

In certain embodiments additional enhancements in the harmonic conversion efficiency may be obtained by combining the non-collinear PM methods taught in this disclosure with adjustments in the power mix ratio of the incident beams. Note that methods of altering the fundamental-to-SH power mix ratio as a way of increasing the THG efficiency were discussed in the prior art by Craxton et al. who employed high energy, flashlamp pumped glass lasers and triplers fabricated from KDP in their early work. It is further noted that due to the large beam diameters utilized in the Craxton et al. experiments, walk-off issues were not of major concern and the selected method of green detuning by polarization was related to the flat top beams employed in the experiments. Preliminary calculations indicate that the walk-off compensation and harmonic optimization techniques as taught by the present invention may be advantageously combined with the SH detuning options discussed by Craxton et al. to thereby achieve further enhancement in the harmonic conversion efficiency. This requires a new analysis to adapt Craxton's expressions to the Gaussian profiles typical of solid-state lasers while taking into account the smaller beam diameters. One fortuitous benefit of the THG schemes as taught in the disclosure is that use of a NCPM crystal as a doubler—as done, for example, in the experiments utilizing the set-up of FIG. 9—allows detuning of the green radiation by using a shorter crystal—a detuning technique that is generally simpler and more straightforward to execute in practice than detuning by way of either temperature or polarization. By contrast, the prior art technique as taught for example by Pieterse et al in U.S. Pat. No. 5,835,513 required use of a Type-I CPM crystal for the doubler, which can be more difficult to detune without sacrificing power or beam quality.

Figure 11:
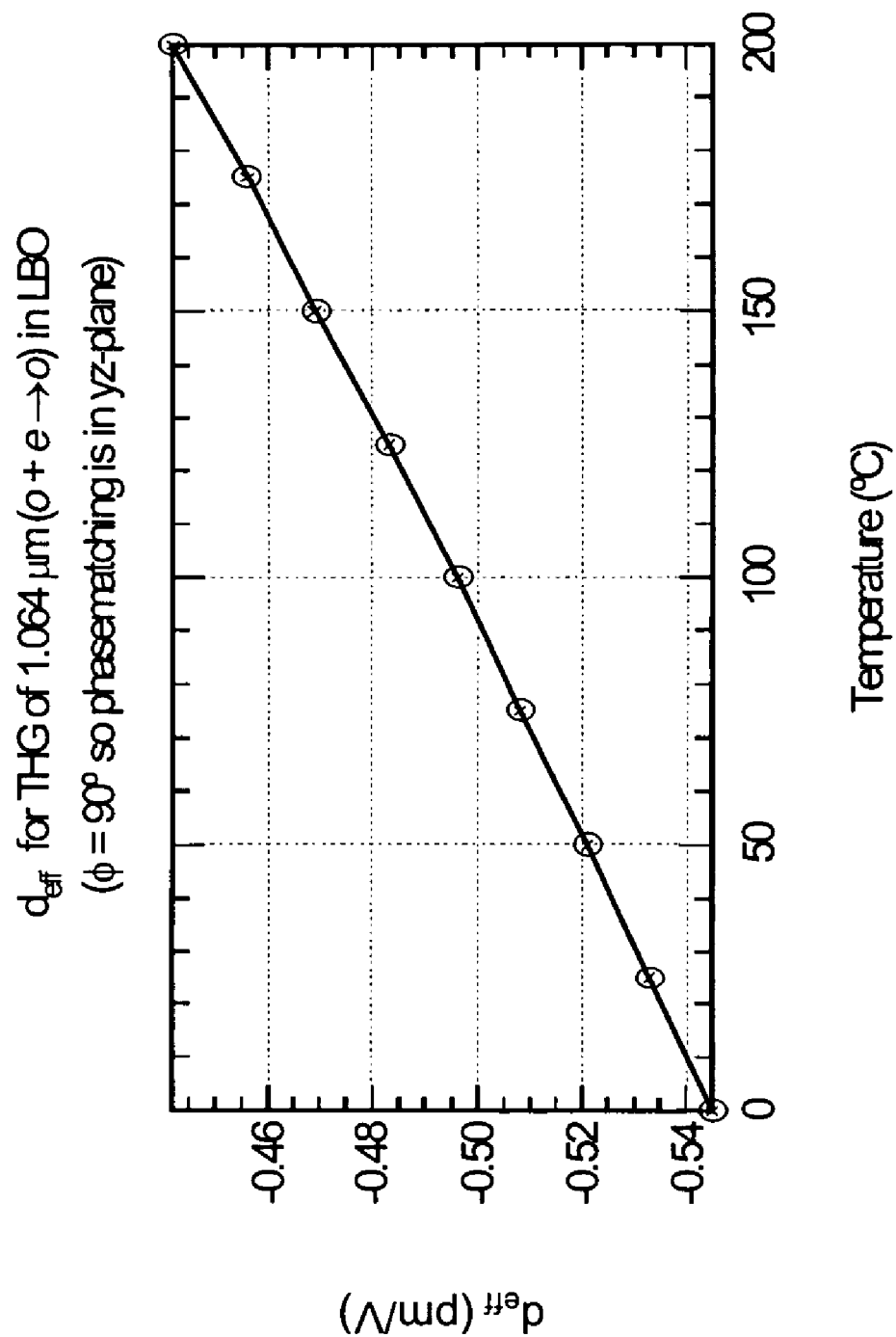
FIG. 11 shows the variation of the non-linear coefficient $d_{eff}$ relative to temperature in LBO.

Generally, the tripler lifetime is the main issue limiting power output in the UV, so techniques to improve the lifetime are preferably addressed in conjunction with techniques designed to increase UV power. In the course of performing the theoretical and experimental evaluations pertinent to this disclosure, the inventors realized that broadening the range of PM parameters pursuant to non-collinear configurations might have the unexpected advantage of improving crystal lifetime as well. In particular, the non-collinear angles may now be selected such that the LBO may be operated at cooler temperatures than is common in the art. As was already taught by Kafka et al. in U.S. Pat. No. 6,697,390, herein incorporated by reference, using a harmonic generator cooled to temperatures below room temperature correlates with significantly improved tripler crystal lifetimes. In one particularly relevant example, our analysis indicates that it is possible to phase match LBO non-collinearly at a temperature of only about 16° C. using a crystal cut of 42°. Using the approach with a wedged crystal, we have further determined that by increasing the wedge angle slightly to just over 17° it is feasible to take advantage of the optimized overlap conditions according to the criteria described in the disclosure. As an added benefit, operating the crystal at cooled temperatures has the advantage of increasing the value of the second-order nonlinearity. FIG. 11 shows results of calculation of the variation of the nonlinearity—as measured by the well known parameter deff as a function of temperature for LBO, indicating an increase by several percent as the temperature is decreased. Higher deff is, in turn, expected to correlate with enhanced conversion efficiency, which depends quadratically on this parameter. Thus both lifetime and efficiency may be increased concurrently in a THG process allowing considerable scaling of the UV power output in practical mode locked and Q-switched laser systems to well beyond levels currently available commercially.

Further, increased harmonic conversion efficiency without compromising the crystal's lifetime may be advantageous for many applications. As was illustrated in FIG. 10, considerable enhancement of the efficiency of third harmonic conversion could be obtained for both mode-locked and pulsed laser systems without increasing the incident power densities on the sensitive faces of the tripler crystals. In particular, third harmonic generation efficiency in the case of an infrared 1064 nm fundamental input source (as provided by a Nd:YVO4) could be increased from around 20% to over 30% for a mode locked laser, and from less than 30% to over 40% for Q-switched lasers. Additional enhancements in the conversion efficiency are feasible using advanced techniques such as optimization of the input powers mix ratio and operating crystals at reduced temperature as was described above. Furthermore, this preliminary application of the methods of the present application was provided without limitation and by example, and the projected improvements in the conversion efficiency can be expected at other fundamental wavelengths and with different types of lasers and nonlinear crystals.

With a view towards practical benefits for laser systems used in applications utilizing harmonic output beams, it is realized that there are situations where the issues involve reliability and/or foot print at a given power level. Thus, to produce a fixed amount of output power at 355 nm, less power at the fundamental is required using the methods taught in this application. This can lead to a more compact system since fewer or no amplifier stages are required to produce the required fundamental power. Less heat will be generated in the process and it may be possible to use a smaller chiller for cooling the laser system or even eliminate the chiller altogether. The lifetime of several consumable elements in the laser system will also be extended. For example, the diode-pump sources can be operated at a lower current to produce the required fundamental power. This leads to increased lifetime of the diode-pump sources and can also lead to an extended service interval between diode replacements.

The increased conversion efficiency can also lead to an extended lifetime for the third harmonic crystal. Thus it is known in the art that increasing the diameter of the beam inside the third harmonic crystal as well as at the exit face, lower fluence (defined as the average power per unit area) results in longer crystal lifetime and longer service intervals, although these improvements typically come at the cost of lower conversion efficiency. Using the techniques described in the invention allows compromising the conversion efficiency in return for some other benefit for the system as a whole. Thus, in one example, the higher efficiency can be traded for longer lifetime.

The increased conversion efficiency of the present invention can thus lead to reduced size and complexity, longer lifetime and service interval and can also lower the initial cost and the cost of ownership of the entire laser system. Several applications can take advantage of the improved performance, reliability and maintenance features offered by implementation of the inventive techniques described heretofore. Such applications include, but are not limited to, inspection, lithography, laser writing and stereolithography. In one example, the application of quasi-cw mode-locked sources to inspection is described in U.S. Pat. No. 6,373,565, incorporated by reference herein. In one example, the improvements of the present invention can be used to increase the third harmonic output power available from a given laser and thus increase the throughput of samples being measured. Alternatively, the reduction in size, complexity and cost and the increase in lifetime and service interval can be advantageous as well.

In another example, the application of quasi-cw mode-locked sources to lithography is described in U.S. Pat. No. 6,421,573, incorporated by reference herein. The application of quasi-cw mode-locked sources to laser writing is described in U.S. Pat. No. 6,246,706, incorporated by reference herein. The improved sources, with higher power and higher efficiency described above, may also be applied to stereolithography systems. Such a stereolithography system is described in U.S. Pat. No. 5,573,722, incorporated by reference herein. In still another example, a more compact and longer life UV source—either in a mode locked or a Q-switched version—may be beneficial in various laser texturing applications as described for example in co-pending U.S. patent application, Ser. No. 10/445,266 incorporated in its entirety herein. Other applications that may benefit from the improvements of the current invention include but are not limited to memory repair, via hole drilling, scribing, marking, ablation and the like.

While various embodiment of the present invention have been described and illustrated herein, those skilled in the art will appreciate that various adaptations, changes, modifications, substitutions, deletions, or additions of procedures and protocols may be made without departing from the spirit and scope of the invention. For example, the three wave mixing process using the harmonic enhancement techniques of the invention may be used for processes other than SFM, such as fifth harmonic generation, optical parametric oscillation, optical parametric generation, optical parametric amplification sum frequency generation, and difference frequency generation. Further, the spirit and scope of the invention disclosed herein is not limited solely to three wave mixing interactions. Rather, any number of waves may be mixed using the methods and systems disclosed herein. The techniques may also be advantageously used in processes other than THG—for example in Fourth and Fifth Harmonic generations processes—designed to generate wavelengths in the deep UV. Any of the three-wave interactions cited above may also be applied with a variety of lasers transmitting at alternative wavelengths, including available laser transitions for Nd or Yb lasers between 0.9 and 1.5 □m or at any other wavelength used in various optical systems. The harmonic enhancement methods taught herein may further be used with widely tunable lasers such as Ti:sapphire or alexandrite and is also readily adapted to efficiently convert the output of emerging pulsed fiber lasers and amplifier systems. Some of the methods described may be especially useful or with less expensive lasers that are tunable over a smaller range, including Yb lasers—both fiber and bulk—and even with certain pulsed diode lasers. The present invention can also provide multiple wavelengths at selectable power mix ratios and is well adapted to use in compact laser systems designed for operation with long life, high beam quality and ease of maintenance. In addition, the embodiments shown may be readily integrated directly into existing harmonic modules and/or laser housing or they may be used in intra-cavity frequency conversion schemes in any of the Type-I or Type-II PM configurations utilized with commonly available crystals. Expected variations or differences in the results are contemplated in accordance with the objects and practices of the present invention. It is intended, therefore, that the invention be defined by the scope of the claims, which follow and that such claims be interpreted as broadly as is reasonable.

What is claimed is:

1. A method of compensating for walkoff in a three wave interaction processes in a nonlinear crystal, comprising:
   providing an optical system having a nonlinear crystal positioned therein and a first wave and second wave propagating therethrough;
   irradiating the nonlinear crystal with the first and second waves;
   generating a third wave within the nonlinear crystal; and
   adjusting the angle of incidence of the first and second waves relative to the principal axis of the nonlinear crystal such that the first, second, and third waves substantially overlap within the nonlinear crystal to maximize the conversion efficiency.

2. The method of claim 1 wherein the first and second waves are incident at the same angle on an input surface of the nonlinear crystal.

3. The method of claim 2 wherein the first and second waves are refracted at different angles by the input surface the nonlinear crystal.

4. The method of claim 1 wherein the first and second waves are directed to the same location on the input surface.

5. The method of claim 1 wherein the first and second waves are incident at the same angle and same location on an input surface of the nonlinear crystal.

6. The method of claim 5 wherein the first and second waves are refracted at different angles by the input surface of the nonlinear crystal.

7. The method of claim 5 wherein the three wave interaction processes comprises third harmonic generation.

8. The method of claim 7 further comprising providing a LBO nonlinear crystal.

9. The method of claim 1 further comprising adjusting the position of at least one of the waves by irradiating a birefringent material with the wave.

10. The method of claim 1 further comprising adjusting the angle and position of at least one of the waves by irradiating a birefringent material with the wave.

11. The method of claim 10 wherein the birefringent material includes an angled surface configured to adjust the angle of at least one of the waves.

12. The method of claim 1 wherein the three wave interaction processes comprises second harmonic generation.

13. The method of claim 1 wherein the three wave interaction processes comprises third harmonic generation.

14. The method of claim 1 wherein the three wave interaction processes comprises fourth harmonic generation.

15. The method of claim 1 wherein the three wave interaction is selected from the group consisting of fifth harmonic generation, optical parametric oscillation, optical parametric generation, optical parametric amplification, sum frequency generation, and difference frequency generation.

16. The method of claim 1 wherein the three wave interaction is non-collinearly phase-matched.

17. The method of claim 1 wherein at least one of the waves is used for memory repair.

18. The method of claim 1 wherein at least one of the waves is used for via hole drilling.

19. The method of claim 1 wherein at least one of the waves is used for scribing.

20. The method of claim 1 wherein at least one of the waves is used for marking.

21. The method of claim 1 wherein at least one of the waves is used for ablation.

22. A device for three wave interaction processes, comprising:
   at least one source providing a first wave and a second wave; and
   a nonlinear crystal having an input surface and at least one principal axis and cofigured to be irradiated by the first and second waves and generate a third wave in response thereto, the first and second waves incident at the same location on the input surface of the nonlinear crystal at an oblique angle of incidence relative to surface of the nonlinear crystal such that the first, second, and third waves overlap within the nonlinear crystal so as to maximize the conversion efficiency.

23. The device of claim 22 further comprising at least one birefringent material positioned between the source and the nonlinear crystal.

24. The device of claim 23 wherein the birefringent material is configured to adjust the position of at least one of the first and second waves relative to the nonlinear crystal.

25. The device of claim 23 wherein the birefringent material is configured to adjust the angle of at least one of the first and second waves relative to the nonlinear crystal.

26. The device of claim 23 wherein the birefringent material further comprises at least one angled surface.

27. The device of claim 26 wherein the angled surface of the birefringent material is configured to adjust the angle of at least one of the first and second waves relative to the nonlinear crystal.

28. The device of claim 26 wherein the birefringent material is configured to adjust the angle and position of at least one of the first and second waves relative to the nonlinear crystal.

29. The device of claim 23 wherein the birefringent material is configured to convert the frequency of at least one of the first and second waves.

30. The device of claim 23 wherein the birefringent material is selected from the group consisting of quartz, vanadate, α-BBO, calcite, KBBF, KGW, and KYW.

31. The device of claim 22 wherein the source comprises a single light source configured to output the first and second waves, the first and second waves having the same wavelength.

32. The device of claim 22 wherein the source comprises a single light source configured to output the first and second waves, the first and second waves having different wavelengths.

33. The device of claim 22 wherein the source comprises a multiple light sources configured to output the first and second waves, the first and second waves having the same wavelength.

34. The device of claim 22 wherein the source comprises multiple light sources configured to output the first second waves, wherein the first and second waves having different wavelengths.

35. The device of claim 22 wherein the source is selected from the group consisting of a laser source, a laser oscillator, a laser amplifier, a mode-locked laser source, a Q-switched laser source, and continuous wave source.

36. The device of claim 22 wherein the source comprises a laser system selected from the group consisting of Nd:YVO4, Nd:YAG, Nd:YLF, Nd:Glass, Ti:sapphire, Cr:YAG, Cr.Forsterite, Yb:YAG, Yb:KGW, Yb:KYW, Yb:glass, KYbW, and YbAG.

37. The device of claim 22 wherein the source comprises an optical system selected from the group consisting of an apatite structure crystal, a semiconductor material, and an optical fiber.

38. The device of claim 22 wherein the nonlinear crystal is LBO.

39. The device of claim 22 wherein the three wave interaction comprises second harmonic generation.

40. The device of claim 22 wherein the three wave interaction comprises third harmonic generation.

41. The device of claim 22 wherein the three wave interation is selected from the group consisting of fourth harmonic generation, fifth harmonic generation, optical parametric oscillation, optical parametric generation, optical parametric amplification sum frequency generation, and difference frequency generation.

42. The device of claim 22 wherein at least one of the waves is used for memory repair.

43. The device of claim 22 wherein at least one of the waves is used for via hole drilling.

44. The device of claim 22 wherein at least one of the waves is used for scribing.

45. The device of claim 22 wherein at least one of the waves is used for marking.

46. The device of claim 22 wherein at least one of the waves is used for ablation.

47. A method of compensating for walkoff in a three wave interaction processes in a nonlinear crystal, comprising:
providing an optical system having a nonlinear crystal positioned therein and a first wave and second wave propagating therethrough;
irradiating an input surface of a nonlinear crystal with the first and second waves, the first and second waves incident at substantially the same angle and substantially same location on an input surface of the nonlinear crystal;
generating a third wave within the nonlinear crystal; and
maximizing a conversion efficiency by adjusting the angle of incidence of the first and second waves relative to the principal axis of the nonlinear crystal such that the first, second, and third waves overlap within the nonlinear crystal.

48. A device for three wave interaction processes, comprising:
at least one source providing a first wave and a second wave; and
a nonlinear crystal having an input surface and at least one principal axis and configured to be irradiated by the first and second waves and generate a third wave in response thereto, the first and second waves incident on the input surface of the nonlinear crystal at a same oblique angle of incidence relative to a surface of the nonlinear crystal and refracted at different angles by the input surface such that the first, second, and third waves overlap within the nonlinear crystal so as to maximize the conversion efficiency.

49. The device of claim 48 further comprising at least one birefringent material positioned between the source and the nonlinear crystal.

50. The device of claim 49 wherein the birefringent material is configured to adjust the position of at least one of the first and second waves relative to the nonlinear crystal.

51. The device of claim 49 wherein the birefringent material is configured to adjust the angle of at least one of the first and second waves relative to the nonlinear crystal.

52. The device of claim 49 wherein the birefringent material further comprises at least one angled surface.

53. The device of claim 52 wherein the angled surface of the birefringent material is configured to adjust the angle of at least one of the first and second waves relative to the nonlinear crystal.

54. The device of claim 49 wherein the birefringent material is configured to adjust the angle and position of at least one of the first and second waves relative to the nonlinear crystal.

55. The device of claim 49 wherein the birefringent material is configured to convert the frequency of at least one of the first and second waves.

56. The device of claim 49 wherein the birefringent material is selected from the group consisting of quartz, vanadate, α-BBO, calcite, KBBF, KGW, and KYW.

57. The device of claim 48 wherein the source comprises a single light source configured to output the first and second waves, the first and second waves having the same wavelength.

58. The device of claim 48 wherein the source comprises a single light source configured to output the first and second waves, the first and second waves having different wavelengths.

59. The device of claim 48 wherein the source comprises a multiple light sources configured to output the first and second waves, the first and second waves having the same wavelength.

60. The device of claim 48 wherein the source comprises multiple light sources configured to output the first second waves, wherein the first and second waves having different wavelengths.

61. The device of claim 48 wherein the source is selected from the group consisting of a laser source, a laser oscillator, a laser amplifier, a mode-locked laser source, a Q-switched laser source, and continuous wave source.

62. The device of claim 48 wherein the source comprises a laser system selected from the group consisting of Nd:YVO4, Nd:YAG, Nd:YLF, Nd:Glass, Ti:sapphire, Cr:YAG, Cr.Forsterite, Yb:YAG, Yb:KGW, Yb:KYW, Yb:glass, KYbW, and YbAG.

63. The device of claim 48 wherein the source comprises an optical system selected from the group consisting of an apatite structure crystal, a semiconductor material, and an optical fiber.

64. The device of claim 48 wherein the nonlinear crystal is LBO.

65. The device of claim 48 wherein the three wave interaction comprises second harmonic generation.

66. The device of claim 48 wherein the three wave interaction comprises third harmonic generation.

67. The device of claim 48 wherein the three wave interation is selected from the group consisting of fourth harmonic generation, fifth harmonic generation, optical parametric oscillation, optical parametric generation, optical parametric amplification sum frequency generation, and difference frequency generation.

68. The device of claim 48 wherein at least one of the waves is used for memory repair.

69. The device of claim 48 wherein at least one of the waves is used for via hole drilling.

70. The device of claim 48 wherein at least one of the waves is used for scribing.

71. The device of claim 48 wherein at least one of the waves is used for marking.

72. The device of claim 48 wherein at least one of the waves is used for ablation.

* * * * *